(12) United States Patent
Hartke et al.

(10) Patent No.: US 6,386,157 B1
(45) Date of Patent: May 14, 2002

(54) METHOD FOR CONTROLLING AN INTERNAL COMBUSTION ENGINE

(75) Inventors: Andreas Hartke, Müchen; Markus Teiner; Thomas Vogt, both of Regensburg, all of (DE)

(73) Assignee: Siemens Aktiengesellschaft

( * ) Notice: Subject to any disclaimer, the term of this patent is extended or adjusted under 35 U.S.C. 154(b) by 0 days.

(21) Appl. No.: 09/787,820

(22) PCT Filed: Mar. 30, 2000

(86) PCT No.: PCT/DE99/03003

§ 371 Date: Mar. 23, 2001

§ 102(e) Date: Mar. 23, 2001

(87) PCT Pub. No.: WO00/17494

PCT Pub. Date: Mar. 30, 2000

(30) Foreign Application Priority Data

Sep. 21, 1998 (DE) .......................... 098 43 174

(51) Int. Cl.[7] .............. F01L 9/04; F02D 41/00; F02D 13/02
(52) U.S. Cl. .................. 123/90.15; 123/90.11
(58) Field of Search .......... 123/90.11, 90.12, 123/90.14, 90.15, 90.16, 90.17

(56) References Cited

U.S. PATENT DOCUMENTS

| | | | | |
|---|---|---|---|---|
| 5,752,478 A | * | 5/1998 | Sono et al. ............... | 123/90.11 |
| 5,765,528 A | * | 6/1998 | Kamimaru ............. | 123/339.19 |
| 5,797,360 A | * | 8/1998 | Pischinger et al. ...... | 123/90.11 |
| 5,996,539 A | * | 12/1999 | Gobel et al. ............. | 123/90.11 |

FOREIGN PATENT DOCUMENTS

| | | | |
|---|---|---|---|
| EP | 152287 | * | 8/1985 |
| EP | 769613 | * | 4/1997 |
| EP | 777038 | * | 6/1997 |
| EP | 854280 | * | 7/1998 |

* cited by examiner

*Primary Examiner*—Weilun Lo
(74) *Attorney, Agent, or Firm*—Morrison & Foerster, LLP

(57) ABSTRACT

An internal combustion engine has a plurality of cylinders to which in each case at least one inlet valve and one outlet valve are assigned. A valve drive is assigned for controlling the inlet valve and a valve drive is assigned for controlling the outlet valve. The valve control time for the inlet valve of a cylinder is calculated at least one segment later than the valve control time for the outlet valve of the same cylinder. The segment is determined by the phase angle between the upper dead centers of two pistons of cylinders which follow one another directly in the ignition sequence.

5 Claims, 4 Drawing Sheets

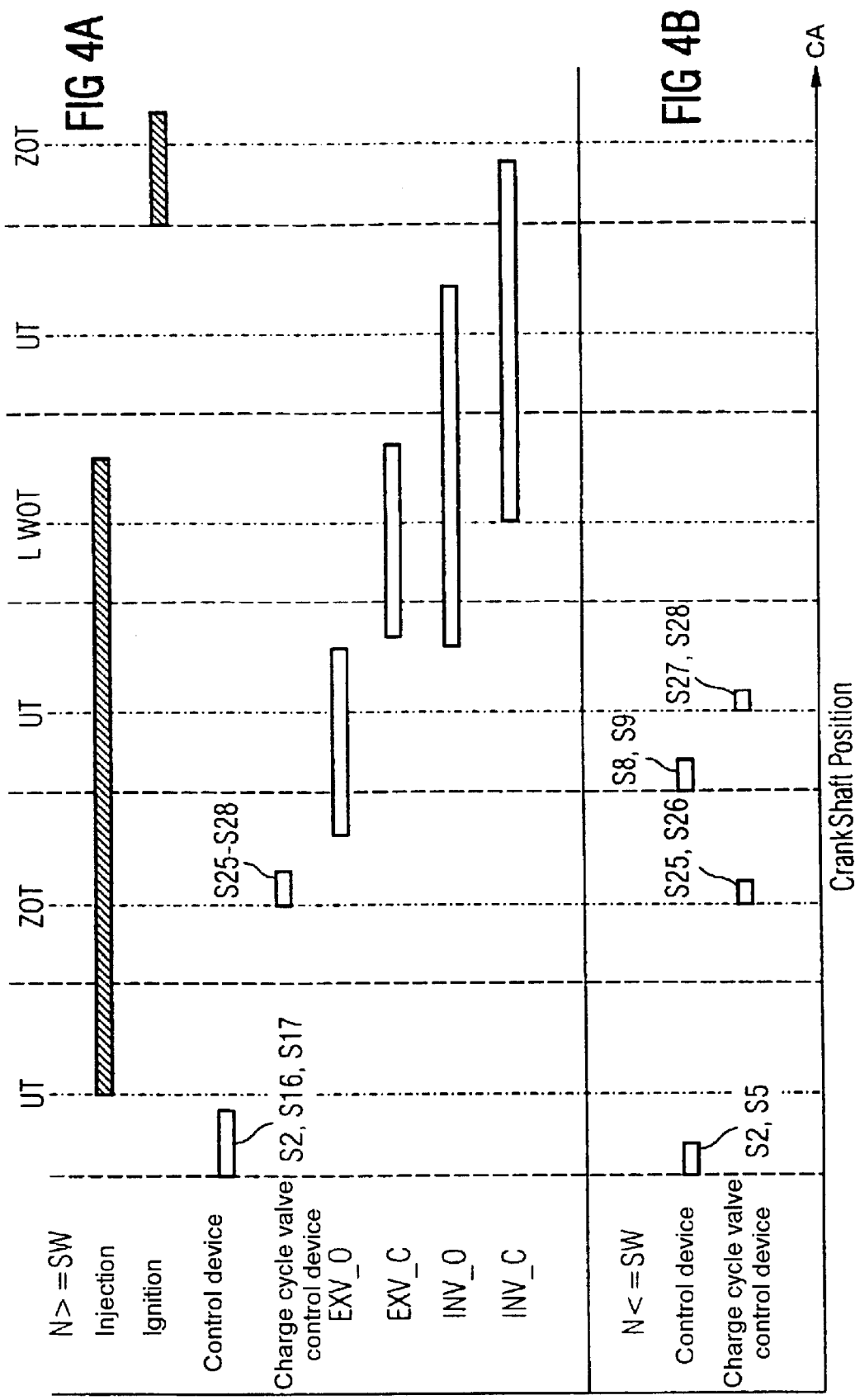

METHOD FOR CONTROLLING AN INTERNAL COMBUSTION ENGINE

This application claims priority to International Application No. PCT/DE99/03003 which was published in the German language on Mar. 30, 2000.

TECHNICAL FIELD OF THE INVENTION

The invention relates to a method for controlling an internal combustion engine, and in particular, to a method of controlling an internal combustion engine having multiple cylinders to which are assigned an inlet valve and an outlet valve.

BACKGROUND OF THE INVENTION

Internal combustions are known with actuating drives which act on the charge cycle valves of the cylinders of the internal combustion engine. The actuating drives control the start of the stroke and/or the end of the stroke and/or the size of the stroke of the charge cycle valves and can change the start of the stroke and/or end of the stroke and/or the size of the stroke as a function of the load requirements. Such internal combustion engines accordingly have the charge cycle valves as actuator elements for setting the load instead of a throttle valve in conventional airflow rates controlled internal combustion engines. The quantity of airflow rate which is to be sucked in by the respective cylinder can be set virtually without loss.

An actuating drive (DE 195 26 683 A1) for charge cycle valves has two electromagnets between which an armature plate can be moved in each case counter to the force of the restoring means by shutting off the coil current at the holding electromagnet and switching on the coil current at the capturing electromagnet. The coil current for the respective capturing electromagnet is set to a predefined capturing value, specifically during a predefined time period which is dimensioned such that the armature plate impacts on a bearing face on the capturing electromagnet within the time period. The coil current of the capturing electromagnet is subsequently regulated to a holding value.

SUMMARY OF THE INVENTION

In one embodiment of the invention, there is a method for controlling an internal combustion engine having a plurality of cylinders, to which in each case at least one inlet valve and one outlet valve are assigned. The method includes, for example, controlling the at least one inlet valve and the at least one outlet valve using a first and second valve drive, respectively, wherein a first valve control time for the inlet valve of a cylinder is calculated at least one segment later than a second valve control time for the at least one outlet valve of the cylinder, a segment being determined by the phase angle between the upper dead centers of two pistons of cylinders which follow one another directly in the ignition sequence.

In one aspect of the method, the first and second valve control times and an actuating signal, dependent on the first and second value control times, respectively, for the first and second valve drives of the respective at least one inlet valve are determined in the same segment.

In another aspect of the invention, the first valve control time for the at least one inlet valve of the respective cylinder is calculated in the segment in which the lower dead center of the piston of the cylinder which follows the upper dead center when ignition occurs is located.

In still another aspect of the invention, the first and second valve control times for the at least one inlet valve and the at least one outlet valve of a cylinder are calculated in each case in the same segment if the rotational speed is higher than a predefined threshold value.

In another embodiment of the invention, there is a system for controlling an internal combustion engine having a plurality of cylinders, to which in each case at least one inlet valve and one outlet valve are assigned. The system includes, for example, a first valve drive controlling the at least one inlet valve and a second valve drive controlling the at least one outlet valve, wherein a first valve control time for the inlet valve of a cylinder is calculated at least one segment later than a second valve control time for the at least one outlet valve of the cylinder, a segment being determined by the phase angle between the upper dead centers of two pistons of cylinders which follow one another directly in the ignition sequence.

BRIEF DESCRIPTION OF THE DRAWINGS

The exemplary embodiments of the invention are explained in more detail below with reference to the schematic drawings, in which:

FIG. 4 shows the sequence in which the programs of the invention run, plotted against a crankshaft angle.

DETAILED DESCRIPTION OF THE INVENTION

Figure 1:
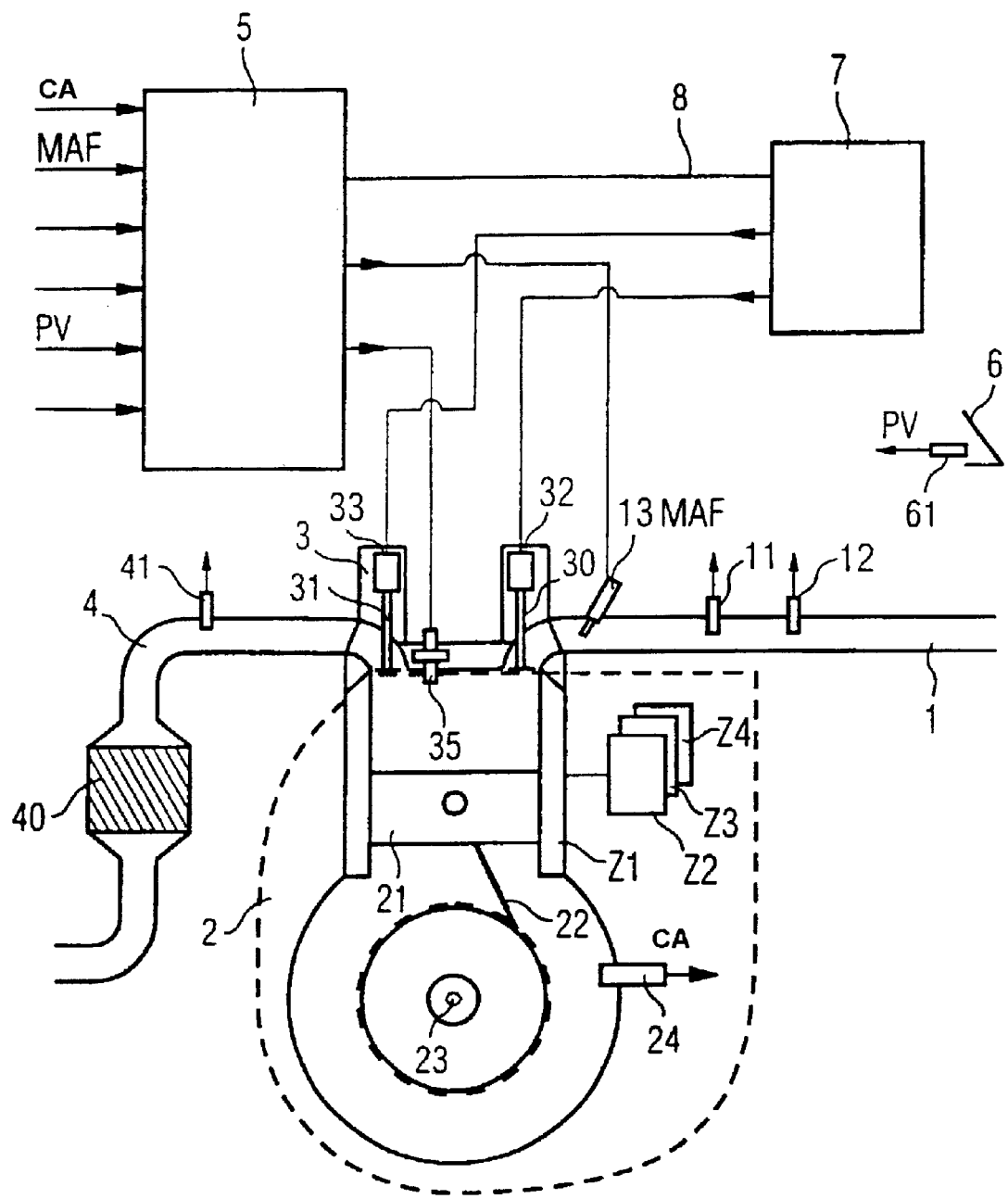
FIG. 1 shows an internal combustion engine.

An internal combustion engine, as illustrated in FIG. 1, comprises an intake tract 1 and an engine block 2 which has a cylinder Z1 and a crankshaft 23. A piston 21 and a connecting rod 22 are assigned to the cylinder Z1. The connecting rod 22 is connected to the piston 21 and the crankshaft 23. A cylinder head 3 is provided in which a valve drive with at least one inlet valve 30 and an outlet valve 31 is arranged. A valve drive 32, 33 is assigned to each of the charge cycle valves which are embodied as inlet valve 30 and outlet valve 31. The valve drives 32, 33 control the start of the stroke, the duration of the stroke and thus the end of the stroke and, if appropriate, the size of the stroke of the respective charge cycle valve. The valve drives 32, 33 are preferably embodied as electromechanical drives with at least one electromagnet and one armature having one armature plate which can move between a first bearing face of the electromagnet and a further bearing face and which forms, together with at least one restoring means, a spring/mass oscillator. By appropriately energizing or not energizing a coil of the electromagnet, the charge cycle valve is moved into an open position or a closed position. The valve drives 32, 33 can also be of electrohydraulic design or designed in some other way which is known to the person skilled in the art and ensures that the valve drive 32, 33 has response characteristics which are sufficient for setting the load of the internal combustion engine.

An injection valve 13 is arranged on the intake tract 1 near to the cylinder head 3. In addition, a spark plug 35 is provided in the cylinder head 3. The injection valve 13 can alternatively also be arranged in the cylinder head 3 in such a way that the fuel is metered in directly in the combustion space of the cylinder Z1. In addition to the cylinder Z1, the internal combustion engine also comprises further cylinders Z2, Z3 and Z4 to which corresponding inlet valves and outlet valves, valve drives, injection valves and spark plugs are assigned.

An exhaust gas tract 4 with a catalytic converter 40 and an oxygen probe 41 is assigned to the internal combustion engine. A control device 5 is provided which is assigned sensors which sense various measurement variables and respectively determine the measured value of the measurement variable. The control device 5 determines, as a function of at least one measurement variable, actuating signals for controlling the injection valve 13 and the spark plug 35, and valve control times VSZ_EX, VSZ_IN for the outlet valve 31 and the inlet valve 30.

The sensors are a pedal position sensor 61 which senses a pedal position PV of the accelerator pedal 6, an airflow rate meter 11 which senses an airflow MAF, a temperature sensor which senses an intake air temperature, and a crankshaft angle sensor which senses a crankshaft angle KW from whose variation over time the rotational speed N of the crankshaft 23 is calculated in the control device 5. In addition, an oxygen probe 41 is provided which senses the residual oxygen content of the exhaust gas in the exhaust gas tract 4 and which assigns an air quotient LAM to it. Depending on the embodiment of the invention, any desired subset of the aforesaid sensors or even additional sensors may be provided.

A charge cycle valve control device 7 is provided which communicates with the control device 5 via a bus 8. The charge cycle valve control device 7 generates, as a function of the valve control times VSZ_EX, VSZ_IN and if appropriate further measurement variables such as the current in the valve drives 32, 33, actuating signals for actuating a setpoint value profile of the current in the valve drives 32, 33.

The control device 5 is preferably embodied as an electronic engine controller. However, it may also comprise further control devices which are electrically connected to one another, for example a bus system. The control device 5 and the charge cycle valve control device 7 can alternatively also be arranged in a single control device.

Figure 2:
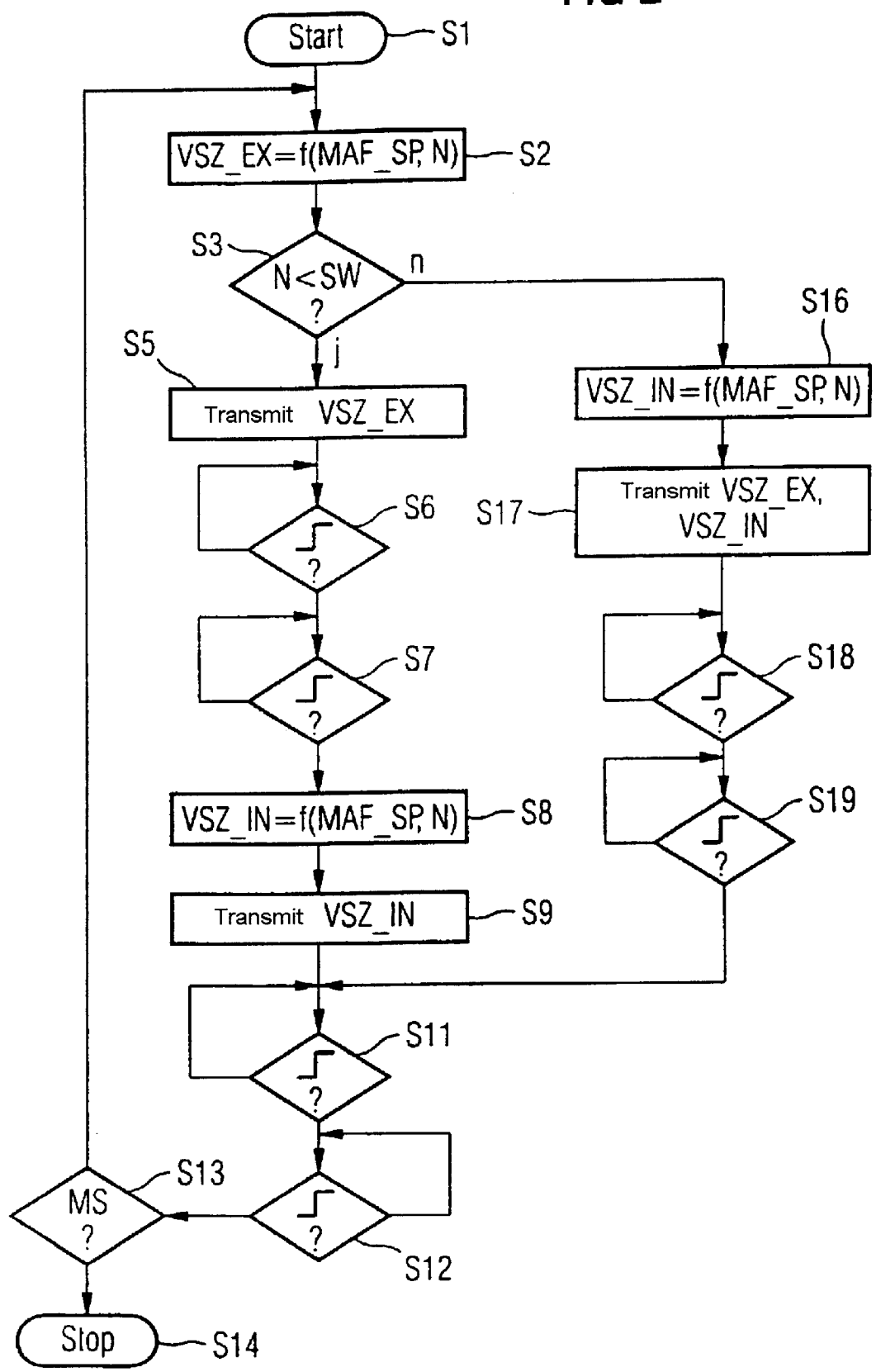
FIG. 2 shows a flowchart of a program which runs in a control device for controlling an internal combustion engine.

A program, as illustrated in FIG. 2, for controlling the internal combustion engine runs in the control device 5 and is stored there. The program is started at S1. At S2, a valve control time VSZ_EX for the outlet valve 31 is determined as a function of a variable which represents the load on the internal combustion engine. A determination is carried out here preferably by means of a characteristic curve or a characteristic diagram. The variable representing the load on the internal combustion engine is, for example, a setpoint value MAF_SP of the air mass flow rate, which variable is determined as a function of the accelerator pedal position, the rotational speed and, if appropriate, further measurement variables and/or requirements of an transmission controller, a traction controller.

At S3 it is tested whether the rotational speed N is lower than a threshold value SW. If this is the case, at S5, the valve control time VSZ_EX of the outlet valve is transmitted to the charge cycle valve control device 7 via the bus 8.

At S6 it is tested whether the segment has been changed. A segment is determined by the phase angle between the upper dead centers of two pistons of cylinders Z1 to Z4 which follow one another directly in the ignition sequence. In a four cylinder internal combustion engine, this phase angle is accordingly 180°, whereas it is 90° in an eight cylinder internal combustion engine. A segment change is detected as a function of the crankshaft angle CA.

The method is started at S1 with respect to the crankshaft angle CA in such a way that S2 to S5 run during the segment in which the lower dead center UT is located before the upper dead center ZOT in the case of ignition.

If no segment change is detected at S6, the test is continued at S6 after a predefined waiting time. Otherwise, at S7 it is tested whether a further segment change has taken place. If this is not the case, the processing is continued again at S7 after the predefined waiting time has expired. If the segment change has taken place, the processing is continued at S8.

At step S8, the valve control time VSZ_IN is determined for the inlet valve from a characteristic curve or a characteristic diagram as a function of the variable characterizing the load on the internal combustion engine, in accordance with the procedure at S2. The setpoint value MA_SP, the rotational speed N and further operating variables are sampled at least once per segment and accordingly updated, with the result that the setpoint value MAF_SP may be different at S8 from the setpoint value MAF_SP of the air mass flow rate at S2.

At S9, the valve control time VSZ_IN is then transmitted to the charge cycle valve control device 7 via the bus 8.

At S11 it is tested whether a further segment change has occurred. If the condition of S11 is not fulfilled, it is tested again after a predefined waiting time. However, if the condition of S11 is fulfilled, a test to determine whether a segment change has taken place is carried out again at S12. If this is not the case, the condition of S12 is tested again after the predefined waiting time. However, if the condition of 12 is fulfilled, a test is carried out at S13 to determine whether the internal combustion engine is in an engine shutdown MS operating state. If this is the case, the program is terminated in the step S14. However, if this is not the case, the processing is continued at S2.

Figure 3:
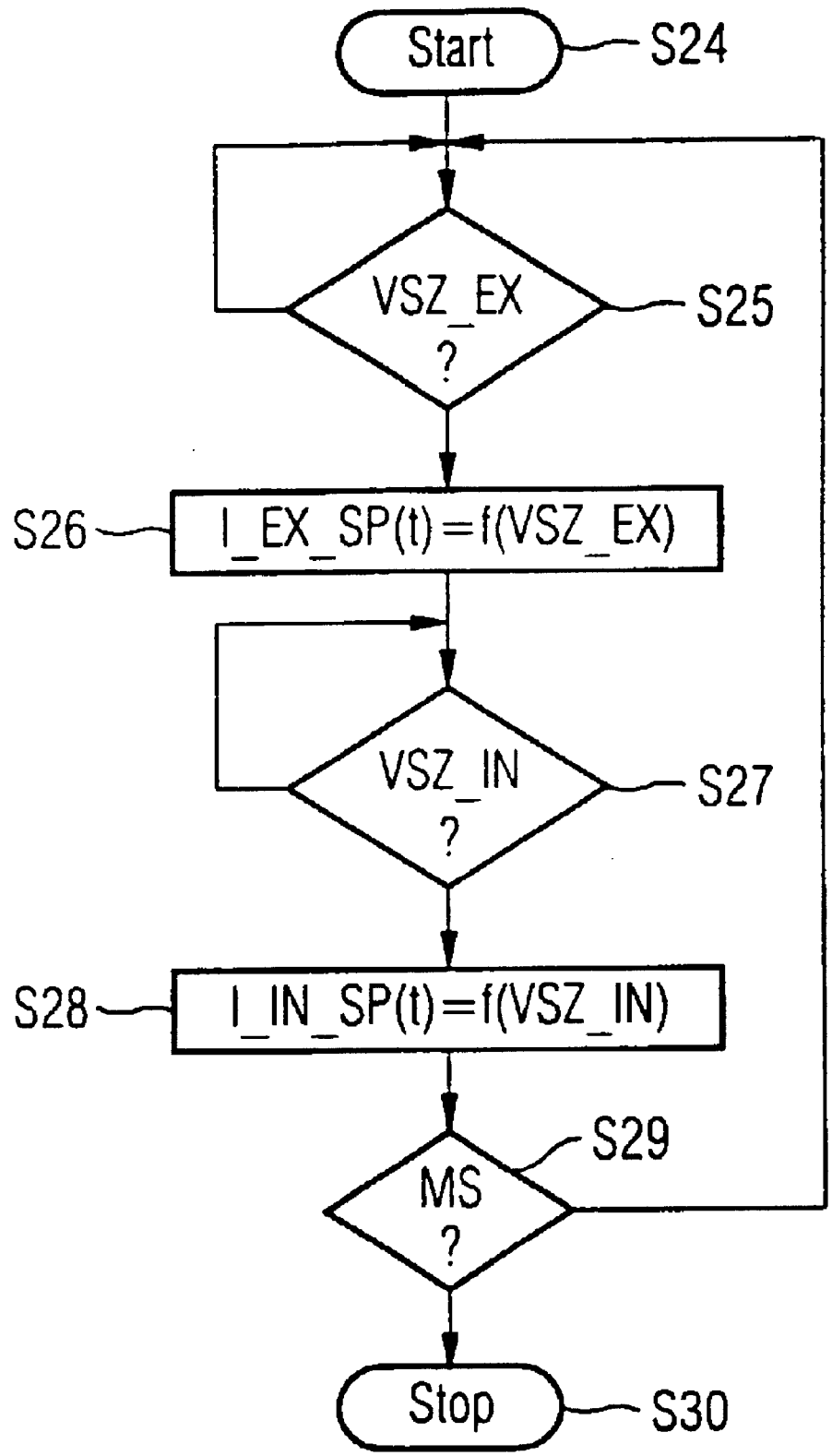
FIG. 3 shows the flowchart of a program which runs in a charge cycle valve control device for controlling the charge cycle valves.

A further program, as illustrated in FIG. 3, for controlling the inlet and outlet valves 30, 31 runs in the charge cycle control device 7 and is stored there. The program is started at S24. At S25 a test is carried out to determine whether a new value of the valve control time VSZ_EX for the outlet valve 31 has been received via the bus 8. If this is the case, a setpoint value profile I_EX_SP(t) of the current in the valve drive 33 is determined as a function of the valve control time VSZ_EX at S26. The setpoint value profile I_EX_SP(t) is preferably determined by interpolation of characteristic diagram values. The setpoint value profile I_EX_SP(t) is then set by means of a controller or regulator and an output stage in the valve drive 33.

At S27 a test is carried out to determine whether the valve control time VSZ_IN for the inlet valve has been received via the bus 8. If this is not the case, the condition of S27 is tested again after the predefined waiting time. If the condition of S27 is fulfilled, a setpoint value profile I_IN_SP(t) of the current for controlling the inlet valve is determined S28, preferably by means of a characteristic diagram or characteristic interpolation from a characteristic diagram as a function of the valve control time VSZ_IN for the inlet valve 30 and set by means of a regulator or a controll and an output stage in the valve drive 32. At S29 a test is carried out to determine whether the internal combustion engine is in the engine shutdown operating stage. If this is the case, the program is terminated at S30. However, if this is not the case, the processing is continued at S25.

FIGS. 4a and 4b show the profile of the processing of S1 to S30 according to FIGS. 2 and 3, plotted against the crankshaft angle CA. UT designates in each case the lower dead center of the piston of the respective cylinder Z1 to Z4, ZOT designates the upper dead center of the piston in the case of ignition, LWOT the upper dead center of the piston during the charge change, EXV_O designates the crankshaft angle range within which the outlet valve can open, EXV_C designates the crankshaft angle range within which the outlet valve can close, INV_O designates the crankshaft angle range within which the inlet valve 30 can open and INV_C designates the cranks ha within which the inlet valve can close.

FIG. 4a shows the variation over time of the processing of S1 to S30, plotted for a rotational speed N which is greater than or equal to the threshold value SW. S2, S16 and S17 are processed in the segment in which the lower dead center UT of the piston is located before the upper dead center ZOT in the case of ignition. As a result of the directly successive processing of S2, S16 and S17, the computational loading of the control device 5 and the loading of the bus 8 are lower than in the case of separate calculation of the corresponding S2, S5, S25 and S26 if the rotational speed N is lower than the threshold value SW. In addition, the valve control times are thus transmitted early via the bus. As a result, even with a high rotational speed N it is ensured that the valve control times VSZ_EX, VSZ_IN for the outlet valve and the inlet valve can be calculated in real time and then set early by means of the charge cycle valve control device such that the outlet valve or the inlet valve reaches its predefined position in good time, despite the presence of the disrupting influence of the so called sticking time of the armature on the bearing face of one of the electromagnets of the valve drive after the energization of the respective coil has been switched off and the predefined flying time of the armature from one bearing face to the other bearing face.

S25 to S28 are processed in the segment in which the upper dead center ZOT is located when ignition occurs. This ensures that the setpoint value profiles of the current can be set in good time.

If the rotational speed N is lower than the threshold value SW (for example lower than 2000 rpm), S2 and S5 are processed, according to FIG. 4b, in the segment in which the lower dead center UT of the piston is located before the upper dead center ZOT when ignition occurs. The steps S25 and S26 are then processed in the segment in which the upper dead center ZOT is located when ignition occurs. The setpoint value profile I_SP_EX(t) of the outlet valve 31 can thus be set in good time.

However, S8 and S9 are not processed until the segment in which the lower dead center UT of the piston is located after the upper dead center ZOT when ignition occurs. Thus, more up to date values of the variable representing the load on the internal combustion engine, that is to say for example the setpoint value MAF_SP or the rotational speed N, can be taken into account for setting the charge in the cylinder. S27 and S28 are processed in the same segment. In this way, changes in the variable representing the load can still be taken into account directly before the opening actuation of the inlet valve 30. This ensures an extremely short dead time. This is an important advantage for regulating the rotational speed during idling in the lower rotational speed range.

What is claimed is:

1. A method for controlling an internal combustion engine having a plurality of cylinders, to which in each case at least one inlet valve and one outlet valve are assigned, comprising:

controlling the at least one inlet valve and the at least one outlet valve using a first and second valve drive, respectively, wherein a first valve control time for the inlet valve of a cylinder is calculated at least one segment later than a second valve control time for the at least one outlet valve of the cylinder, a segment being determined by the phase angle between the upper dead centers of two pistons of cylinders which follow one another directly in the ignition sequence.

2. The method according to claim 1, wherein the first and second valve control times and an actuating signal, dependent on the first and second value control times, respectively, for the first and second valve drives of the respective at least one inlet valve are determined in the same segment.

3. The method as claimed in claim 1 wherein the first valve control time for the at least one inlet valve of the respective cylinder is calculated in the segment in which the lower dead center of the piston of the cylinder which follows the upper dead center when ignition occurs is located.

4. The method according to claim 1, wherein the first and second valve control times for the at least one inlet valve and the at least one outlet valve of a cylinder are calculated in each case in the same segment if the rotational speed is higher than a predefined threshold value.

5. A system for controlling an internal combustion engine having a plurality of cylinders, to which in each case at least one inlet valve and one outlet valve are assigned, comprising:

a first valve drive controlling the at least one inlet valve and a second valve drive controlling the at least one outlet valve, wherein a first valve control time for the inlet valve of a cylinder is calculated at least one segment later than a second valve control time for the at least one outlet valve of the cylinder, a segment being determined by the phase angle between the upper dead centers of two pistons of cylinders which follow one another directly in the ignition sequence.

* * * * *

UNITED STATES PATENT AND TRADEMARK OFFICE
CERTIFICATE OF CORRECTION

PATENT NO. : 6,386,157, B1
DATED : May 14, 2002
INVENTOR(S) : Andreas Hartke et al.

It is certified that error appears in the above-identified patent and that said Letters Patent is hereby corrected as shown below:

<u>Title page,</u>
Item [22], PCT Filed, change "March 30, 2000" to -- September 20, 1999 --.

Signed and Sealed this

Thirteenth Day of June, 2006

JON W. DUDAS
*Director of the United States Patent and Trademark Office*